United States Patent
Little

(10) Patent No.: US 9,092,216 B2
(45) Date of Patent: Jul. 28, 2015

(54) TRANSACTIONAL OBJECT CONTAINER

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 68 days.

(21) Appl. No.: 13/866,929

(22) Filed: Apr. 19, 2013

(65) Prior Publication Data

US 2013/0239088 A1 Sep. 12, 2013

Related U.S. Application Data

(63) Continuation of application No. 12/475,429, filed on May 29, 2009, now Pat. No. 8,429,606.

(51) Int. Cl.
  *G06F 9/44* (2006.01)
  *G06F 9/45* (2006.01)
  *G06F 9/46* (2006.01)
  *G06F 9/52* (2006.01)

(52) U.S. Cl.
  CPC ............... *G06F 8/315* (2013.01); *G06F 9/466* (2013.01); *G06F 9/526* (2013.01); *G06F 8/41* (2013.01)

(58) Field of Classification Search
  CPC ..... G06F 9/4428; G06F 9/4425; G06F 9/465; G06F 9/466; G06F 8/315; G06F 9/526; G06F 8/41
  See application file for complete search history.

(56) References Cited

U.S. PATENT DOCUMENTS

| | | | |
|---|---|---|---|
| 6,597,366 B1 | 7/2003 | Bennett et al. | |
| 6,944,851 B1 * | 9/2005 | Dixon, III et al. | 717/136 |
| 7,024,656 B1 | 4/2006 | Ahad | |
| 7,100,195 B1 | 8/2006 | Underwood | |
| 7,210,135 B2 | 4/2007 | McCrady et al. | |
| 7,272,820 B2 | 9/2007 | Klianev | |
| 7,356,532 B2 * | 4/2008 | Wiser et al. | 707/703 |
| 7,451,434 B1 * | 11/2008 | Blumenthal et al. | 717/116 |
| 7,836,436 B2 | 11/2010 | Ringseth et al. | |
| 7,895,582 B2 | 2/2011 | Duffy et al. | |
| 7,913,234 B2 | 3/2011 | Neil et al. | |
| 7,913,236 B2 * | 3/2011 | Adl-tabatabai et al. | 717/140 |
| 7,971,194 B1 * | 6/2011 | Gilboa | 717/136 |
| 8,065,499 B2 | 11/2011 | Dice et al. | |
| 8,132,158 B2 * | 3/2012 | Wang et al. | 717/127 |
| 8,141,034 B2 * | 3/2012 | Foti | 717/106 |
| 8,209,669 B2 * | 6/2012 | Schneider et al. | 717/127 |

(Continued)

OTHER PUBLICATIONS

Justin Gottschlich, Exploration of Lock-Based Software Transactional Memory, 2007, pp. 39-61.*
Atomikos, Atomikos TransactionsEssentials API Specification Guide, 2006, pp. 3-33.*
Yasmin Akbar-husain, Optimistic Locking pattern for EJBs, 2001, pp. 1-8.*

(Continued)

*Primary Examiner* — Thuy Dao
*Assistant Examiner* — Mongbao Nguyen
(74) *Attorney, Agent, or Firm* — Lowenstein Sandler LLP

(57) ABSTRACT

A processing device receives a transactional object at runtime of a compiled application, the transactional object comprising first transactional logic. The processing device determines a locking strategy to use for the transactional object. The processing device generates a transactional proxy for the transactional object, the transactional proxy comprising a transactional marker, a pointer to the transactional object, and second transactional logic that supersedes the first transactional logic. The processing device passes the transactional proxy to the application, wherein the application is to make calls on the transactional proxy instead of on the transactional object.

17 Claims, 6 Drawing Sheets

(56) References Cited

U.S. PATENT DOCUMENTS

| | | |
|---|---|---|
| 8,495,103 B2 | 7/2013 | Little |
| 2003/0005172 A1* | 1/2003 | Chessell ................. 709/316 |
| 2004/0002906 A1 | 1/2004 | Von Drehnen et al. |
| 2004/0015851 A1* | 1/2004 | Newhook et al. ........... 717/116 |
| 2004/0078782 A1* | 4/2004 | Clement et al. ............ 717/116 |
| 2004/0143822 A1* | 7/2004 | Jager et al. ................ 717/140 |
| 2004/0254881 A1 | 12/2004 | Kumar et al. |
| 2005/0039171 A1* | 2/2005 | Avakian et al. ............ 717/127 |
| 2005/0120036 A1 | 6/2005 | Verma et al. |
| 2005/0125401 A1 | 6/2005 | Carr et al. |
| 2005/0289146 A1* | 12/2005 | Long et al. ................. 707/10 |
| 2006/0136464 A1 | 6/2006 | Rossmann |
| 2006/0230402 A1* | 10/2006 | Newport et al. ............ 718/1 |
| 2007/0067437 A1 | 3/2007 | Sindambiwe |
| 2007/0169015 A1* | 7/2007 | Seelig et al. ............... 717/136 |
| 2007/0169031 A1* | 7/2007 | Harris ........................ 717/140 |
| 2007/0240127 A1* | 10/2007 | Roques et al. ............. 717/136 |
| 2009/0037355 A1 | 2/2009 | Brave et al. |
| 2009/0125519 A1 | 5/2009 | Robison et al. |
| 2009/0276431 A1 | 11/2009 | Lind et al. |
| 2009/0313603 A1 | 12/2009 | Tendler et al. |
| 2009/0319739 A1 | 12/2009 | Shpeisman et al. |
| 2009/0327636 A1 | 12/2009 | Detlefs et al. |
| 2010/0042999 A1* | 2/2010 | Dorai et al. ................ 718/101 |

OTHER PUBLICATIONS

Edward E. Cobb, "The Impact of Object Technology on Commercial Transaction Processing," IBM Corporation, 1996, pp. 174-185.

Maurice Herlihy, Transactional Boosting: A Methodology for Highly-Concurrent Transactional Objects, Computer Science Department, Brown University, 2008, pp. 2-5.

Thomas Sandholm, Object Caching in a Transactional, Object-Relational CORBA Environment, Department of Computer and Systems Sciences University of Stockholm, 1998, pp. 7-10 and 55-64.

"JBoss Transactions 4.2.3, JTS Programmers Guide," 2006, 117 pages.

USPTO Non-Final Office Action for U.S. Appl. No. 12/475,429 mailed Jul. 5, 2012.

USPTO Notice of Allowance for U.S. Appl. No. 12/475,429 mailed Dec. 14, 2012.

Guandong et al., "A Web Recommendation Technique Based on Probabilistic Latent Semantic Analysis," Sep. 21, 2005.

USPTO Non-Final Office Action for U.S. Appl. No. 12/475,433 mailed Aug. 16, 2011.

USPTO Final Office Action for U.S. Appl. No. 12/475,433 mailed Dec. 29, 2011.

USPTO Non-Final Office Action for U.S. Appl. No. 12/475,433 mailed Oct. 11, 2012.

USPTO Notice of Allowance for U.S. Appl. No. 12/475,433 mailed Mar. 22, 2013.

* cited by examiner

TRANSACTIONAL OBJECT CONTAINER

RELATED APPLICATIONS

The present application is a continuation patent application of application Ser. No. 12/475,429, filed May 29, 2009, which is herein incorporated by reference.

TECHNICAL FIELD

Embodiments of the present invention relate to transaction systems, and more specifically to transforming non-transactional objects into transactional objects.

BACKGROUND

Distributed transactions are often performed on distributed computing systems. A distributed transaction is a set of operations that update shared resources. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared resources. The Isolation property requires that intermediate effects of the transaction are not detectable to concurrent transactions. Finally, the Durability property requires that changes to shared resources due to the transaction are permanent.

After an application has been compiled and deployed, an administrator may determine that the application should be transactional. The administrator then modifies the source code of the application to make classes (and objects that inherit from them) within the application transactional. A transactional object is defined herein as an object that can participate in transactions. A transactional object may include semantics for participating in transactions, such as methods for rolling back and committing state changes associated with a transaction. Conventionally, an object cannot be transformed into a transactional object if the administrator does not have access to the source code for the application. Even if he does have the source code, changing the source code takes time, and can be error prone.

Some transaction systems include tools to aid in turning ordinary objects into transactional objects. However, such tools still require that the code of the objects be modified. Moreover, such tools are used at compile time (when an application is being compiled). Conventional transaction systems do not include mechanisms to change an ordinary object into a transactional object at runtime (during the execution of an application).

BRIEF DESCRIPTION OF THE DRAWINGS

The present invention is illustrated by way of example, and not by way of limitation, in the figures of the accompanying drawings and in which.

DETAILED DESCRIPTION

Figure 1A:
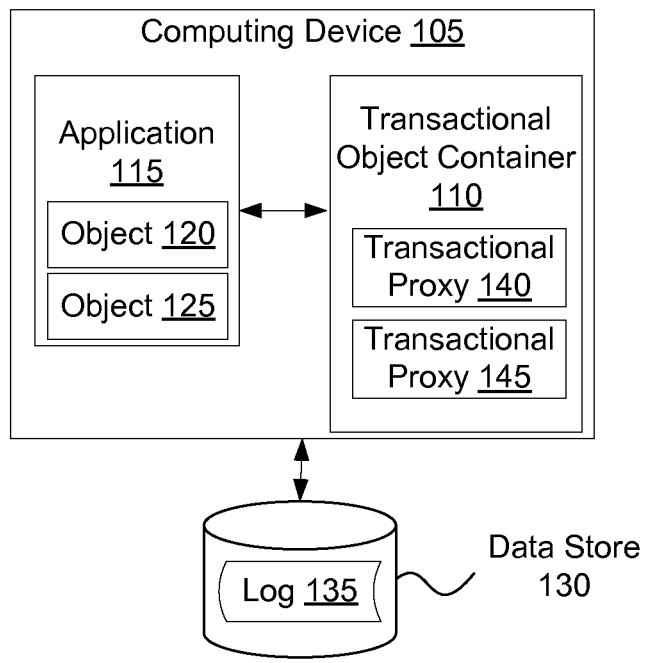
FIG. 1A illustrates an exemplary computing device connected to a data store, in accordance with one embodiment of the present invention.

Described herein is a method and apparatus for transforming non-transactional objects into transactional objects. In one embodiment, a computing device receives an object at runtime of a compiled application. The received object is a component of the application. In one embodiment, a transactional object container hosted by the computing device receives the object. The computing device and/or transactional object container generates a transactional proxy for the object. The transactional proxy includes transactional logic, a transactional marker and one or more pointers to the object. The transactional proxy is passed to the application. The application can then make calls on the transactional proxy instead of on the object. The transactional proxy can perform transactional functions, and forward the calls to the original object.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "saving", "setting", "receiving", "passing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

FIG. 1A illustrates an exemplary computing device 105 connected to a data store 130, in accordance with one embodiment of the present invention. The computing device 105 may be, for example, a personal computer (PC), palm-sized computing device, personal digital assistant (PDA), etc. Computing device 105 may be a single machine, or may include multiple interconnected machines (e.g., machines configured in a cluster). The computing device 105 may be configured as a server, a client, a database, and so on.

Computing device 105 includes an application 115 and a transactional object container 110. In one embodiment, application 115 is a service or other functionality that is available to clients (e.g., in a service oriented architecture (SOA)). In another embodiment, application 115 is a client application that accesses services. Application 115 may have been written in an object oriented programming language such as Java, C++, etc. In one embodiment, application 115 has been written using aspect oriented programming techniques.

Application 115 is structured as a collection of interrelated objects (e.g., object 120 and object 125). Each object 120, 125 is a component of the application 115 that performs a specific set of related behaviors. Each object 120, 125 may be a self-sufficient module that contains all the information necessary to manipulate its own data structure. Objects 120, 125 are capable of receiving messages, processing data, and sending messages to other objects of the same or different applications, and can be viewed as independent machines with distinct roles or responsibilities.

In one embodiment, application 115 is not a transactional application, and thus object 120 and object 125 are non-transactional objects. As non-transactional (or ordinary) objects, these objects 120, 125 are not capable of participating in transactions. In another embodiment, application 115 is a transactional application, in which case one or both of object 120 and object 125 are transactional objects (objects capable of participating in transactions).

Each transactional object has a locking and/or concurrency control strategy. The locking strategy designates when the object will request locks and the type of locks that the transactional object will request. The object may request locks, for example, for data items accessed by the object and/or for the object when its state is accessed or its methods are called. Application 115 may have a universal locking strategy that applies to both object 120 and 125. Alternatively, object 120 and object 125 may have different locking strategies. Moreover, a locking strategy may implement different locks on different data items and/or on different fields of the object. For example, object 120 may include a locking strategy that implements read locks on documents and write locks on log files. Other locking strategies are also possible.

A transaction system determines whether an object 120, 125 is a transactional object by checking whether the object 120, 125 has a transactional marker. Objects 120, 125 that do not have this transactional marker will be ignored by the transaction system, while objects that have this transactional marker will be managed by the transaction system. In one embodiment, an object 120, 125 has this transactional marker if it is instantiated from a class that inherits from a transaction base class. Typically, objects that do no inherit from the transaction base class cannot be managed transactionally. However, in one embodiment, transaction object container 110 is used to add the transactional marker to objects 120, 125, thus making them transactional.

If application 115 is not transactional, at some point it may become necessary to make it transactional. Moreover, if application 115 is transactional, some objects 120, 125 may not be transactional that should be transactional and/or some objects 120, 125 that are transactional should not be transactional. Additionally, the locking strategies for objects that are transactional may not be optimal. For example, a particular locking strategy may be okay when the number of concurrent readers and writers is small. However, as the application 115 scales up in size, the locking strategy may become inefficient, or even become a bottleneck for a transaction. As the number of users increases, the workload increases (e.g., the number of threads running within the computing device 105 increases). This could cause many adverse effects, and cause the system to grind to a halt due to the chosen locking strategies. In one embodiment, these problems are addressed by transactional object container 110.

Transactional object container 110 is a specialized object container that is configured to hold objects of arbitrary class, and make those objects transactional. Transactional object container 110 may be implemented using any object oriented programming language, such as Java of C++. An object container is a class, data structure or abstract data type whose instances are collections of other objects. In one embodiment, the transactional object container 110 includes one or more methods and/or fields that are used to participate in transactions. For example, the transactional object container may include methods for setting and releasing locks, enrolling in transactions, rolling back or committing to transactions, etc. The transactional object container 110 also includes methods for adding objects to itself and for removing objects from itself.

In one embodiment, object 120 and/or object 125 can be transformed into transactional objects by adding them to the transactional object container 110. When an object is placed in the transactional object container 110, the transactional object container 110 creates a new object, referred to herein as a transactional proxy (e.g., transactional proxy 140 and transactional proxy 145), for that object placed within the transactional object container 110. The transactional proxy 140, 145 inherits fields and/or methods from the transactional object container 110, and also retains any methods and/or fields of the object 120 that it has been generated from. Thus, a transactional proxy can include both fields and methods from the original object 120, 125 and from the transactional object container 110.

During operation of application 115, a transactional proxy receives all commands meant for an associated object. For example, transactional proxy 140 may have been generated for object 120, and may receive all commands meant for object 120. The received commands may be commands to use any of the methods of the object, commands to access a state of any variables of the object, etc. Upon receiving such a command, the transactional proxy will check to see whether there is a transaction in flight (pending). If a transaction is in flight, the transactional proxy will register the object with the transaction. If no transaction is currently pending, then a transaction will be started for the transactional proxy. The transaction will inform the transactional proxy when a transaction commits and when a transaction rolls back.

In one embodiment, the transactional object container 110 is a value based container that stores complete duplicates of objects 120, 125 that are added to it. Such duplicates may include the actual logic of methods and/or values of fields included in the object being duplicated. In another embodiment, transactional object container 110 may be a reference based container. In such an embodiment, a transactional proxy (e.g., transactional proxy 140) includes all of the fields and/or methods of an object (e.g., object 120). However, instead of the transactional proxy storing the actual values of the fields and the logic of the methods, methods and fields in the transactional proxy inherited from the object include pointers (or other references) to that same field or method in the corresponding object.

In one embodiment, transactional object container 110 identifies to an application 115 those objects of the application 115 that should be added to the transactional container 110. In one embodiment, in which the application 115 runs on a Java virtual machine, transactional object container 110 identifies to the Java virtual machine those objects that should be added to the transactional object container. The application or Java virtual machine may then send all objects of the identified type to the transactional object container 110. For example, transactional object container 110 may identify that all objects of particular classes should be added to it. Thus, when application 115 instantiates a new object, transactional object container may add the new object and generate a new transactional proxy for it. The transactional object container can then pass the transactional proxy to the application 115. Thus, whenever the application 115 attempts to access the new object (e.g., to read a state of the object or execute a method of the object), the application 115 is actually performing this action on the transactional proxy. The transactional proxy performs any actions necessary for participating in a transaction, and then forwards the access request on to the object. As a result, an object that was not designed to be transactional may participate in transactions.

In one embodiment, transactional object container 110 requests objects of particular classes. In another embodiment, all new objects are passed to the transactional object container 110 upon being created. The transactional object container 110 inspects the object, and determines whether to transform the object into a transactional object (or to otherwise create a transactional proxy for the object).

In one embodiment, transactional proxies 140, 145 dynamically determine a locking strategy to use upon receiving a command to access an object. Transactional proxy 140, 145 may infer what locking strategy to use (e.g., what locks to set) by examining requested operations, methods and/or variables, and identifying the type of action that is to be performed. For example, if application 115 attempts to read object 120, transactional proxy 140 may set a read lock before passing on the read request to object 120. Alternatively, if application 115 attempts to modify a state of object 120, transactional proxy 140 may set a write lock before passing the request to modify the state on to object 120. The dynamic locking strategy works well generally, but does not afford an administrator fine grain control of transactions.

In another embodiment, transactional object container 110 is configured to generate transactional proxies that always use a particular locking strategy. For example, a transactional proxy may be configured to set a write lock whether a read request or a write request is received from application 115. In one embodiment, transactional object container 110 assigns different locking strategies based on the class of object that is added to it. For example, transactional object container 110 may generate transactional proxies that always set read locks for objects of a first class that are passed into it, and may generate transactional proxies that always set write locks for objects of a second class that are passed into it.

In one embodiment, transactional proxy object container 110 determines what locking strategy to use for specific objects and/or classes based on input from an application optimizer (not shown). Transactional object container 110 may also determine which objects 120, 125 to make transactional based on input from the application optimizer. The application optimizer monitors application 115 and/or additional applications (not shown) running on computing device 105. Based on the monitoring, the application optimizer identifies usage patterns of object 120 and object 125. The usage patterns can be patterns of how the objects 120, 125 use data items, how data items of the objects 120, 125 are accessed, how the data objects 120, 125 communicate with each other and/or other data objects or other applications, etc. The application optimizer can then recommend that one or both of object 120 and object 125 be transactional objects. The application optimizer 110 can also recommend specific locking strategies for the objects 120, 125. In one embodiment, application optimizer reports which objects should be transactional and what locking strategies to use to the transactional object container 110.

In one embodiment, objects that are already transactional may be passed in to transactional object container 110. Such transactional objects may be added to transactional object container 110, for example, if it is determined that the locking strategy or concurrency control strategy used by the objects is sub-optimal. In such an embodiment, the transactional object container 110 may generate a transactional proxy for the transactional object in the same manner that it does for non-transactional objects. The transactional object container 110 gives the transactional proxy a locking strategy that supersedes the locking strategy of the transactional object. The transactional proxy may then perform all transactional behavior for the transactional object, rather than having the transactional object perform such functions. Thus, the behavior of transactional objects may be modified without modifying a code of the transactional objects.

In one embodiment, computing device 105 is coupled with a data store 130. Data store 130 may include a file system, a database, or other data storage arrangement. In one embodiment, data store 130 is internal to computing device 105. Alternatively, data store 130 may be external to computing device 105, and connected with computing device 105 either directly or via a network. In one embodiment, transactional proxies 140, 145 store transaction logs 135 for objects 120, 125 in data store 130. A transactional proxy 140, 145 may use a transaction log to roll back a transaction if it is aborted, or to recover a transaction if the system fails during the transaction.

Figure 1B:
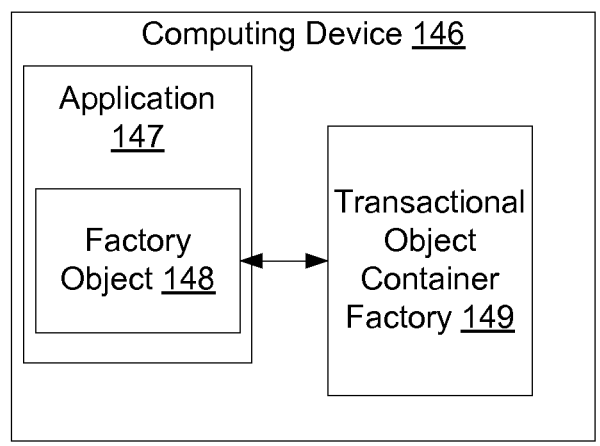
FIG. 1B illustrates a computing device, in accordance with another embodiment of the present invention.

FIG. 1B illustrates a computing device 146, in accordance with another embodiment of the present invention. The computing device 146 includes an application 147 and a transactional object container factory 149. The application 147 includes a factory object 148. Factory object 148 generates new objects. Factory object 148 may include a separate method for each type of object that it can create. In one embodiment, the factory object 148 can dynamically create a new class that the new object inherits from.

In one embodiment, the transactional object container factory 149 is chained with the factory object 148. When factory object 148 generates a new object, that object is passed to transactional object container factory 149, which creates a new transactional object container. The new object is passed into the new transactional object container, and the new transactional object container generates a new transactional proxy for the new object. This new transactional proxy can then be passed back to application 147.

Figure 1C:
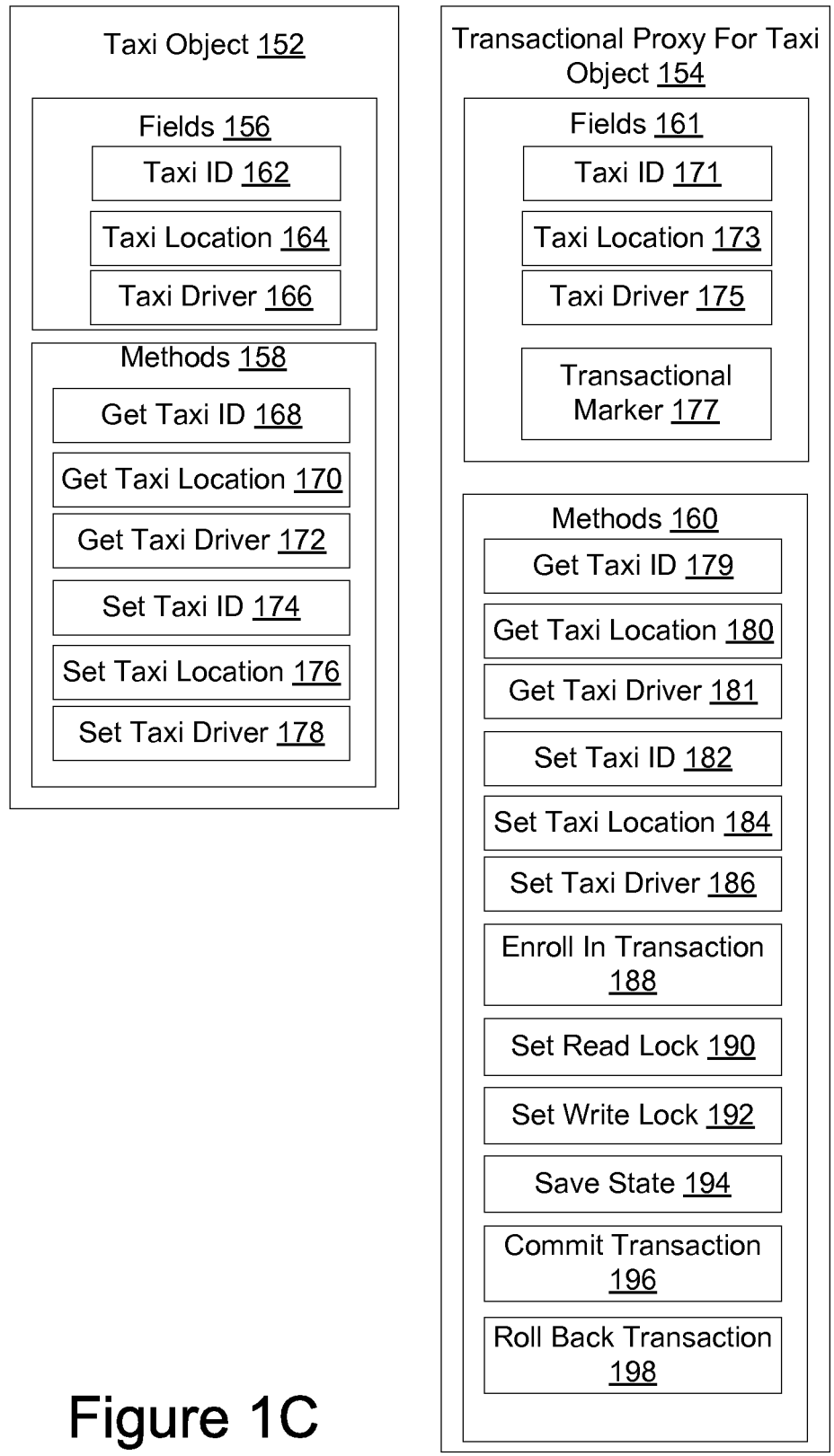
FIG. 1C illustrates an example taxi object and an example transactional proxy for the taxi object, in accordance with one embodiment of the present invention.

FIG. 1C illustrates an example taxi object 152 and an example transactional proxy for the taxi object 154, in accordance with one embodiment of the present invention. The taxi object 152 may correspond, for example, to object 120 of FIG. 1A. Similarly, the transactional proxy for the taxi object 154 may correspond to transactional proxy 140 of FIG. 1A.

The example taxi object 152 may represent, for example, a real taxi in a taxi reservation service. The taxi object 152 may include the fields 156 of taxi ID 162, taxi location 164 and taxi driver 166. Taxi ID 162 may have a value that is an integer, and taxi location 164 and taxi driver 166 may have values that are strings. The values of the fields 156 make up a state of the taxi object 156. The taxi object 152 may also include the methods 158 get taxi ID 168, get taxi location 170, get taxi driver 172, set taxi ID 174, set taxi location 176 and set taxi driver 178. Each of these methods includes logic that, when executed, acts on one or more fields of the taxi object 152. The taxi object 152 is not a transactional object, and therefore does not contain any methods for participating in transactions. Nor does the taxi object 152 have a transactional marker.

The example transactional proxy 154 has been generated for the taxi object 152. As illustrated, the transactional proxy 154 includes all of the fields 161 and methods 160 that taxi object 152 includes. However, in one embodiment each of these methods 160 and fields 161 has a pointer to an appropriate method or field of taxi object 152. In one embodiment, in addition to those methods 158 included in taxi object 152, the transactional proxy 154 also includes the methods enroll in transaction 188, set read lock 190, set write lock 192, save state 194, commit transaction 196 and roll back transaction 198, which are methods for participating in transactions. The transactional proxy 154 may also have greater or fewer methods for participating in transactions. Additionally, the transactional proxy 154 includes a transactional marker 177. In one embodiment, the transactional marker 177 is a field of the proxy (as shown). Alternatively, one or more methods that is used by the transactional proxy 154 or observable properties of the transactional proxy 154 that are unique to transactional objects may act as a transactional marker.

Transactional object 154 appears to processes and applications as if it were the taxi object 152. Thus, transactional proxy 154 receives all attempts to modify or access the state of taxi object 152. Any time a process generates a request to modify or access the state in taxi object 152, the transactional proxy 154 manages the request in a transactional manner. So, if a process tries to modify the value of taxi ID 170, for example, the transactional proxy will perform the method set write lock 192 on the taxi ID 170 so that no other process can modify it at the same time. The transactional proxy 154 will then forward the request to the taxi object, which will perform the method set taxi ID 174 to modify the taxi ID 162.

Figure 2:
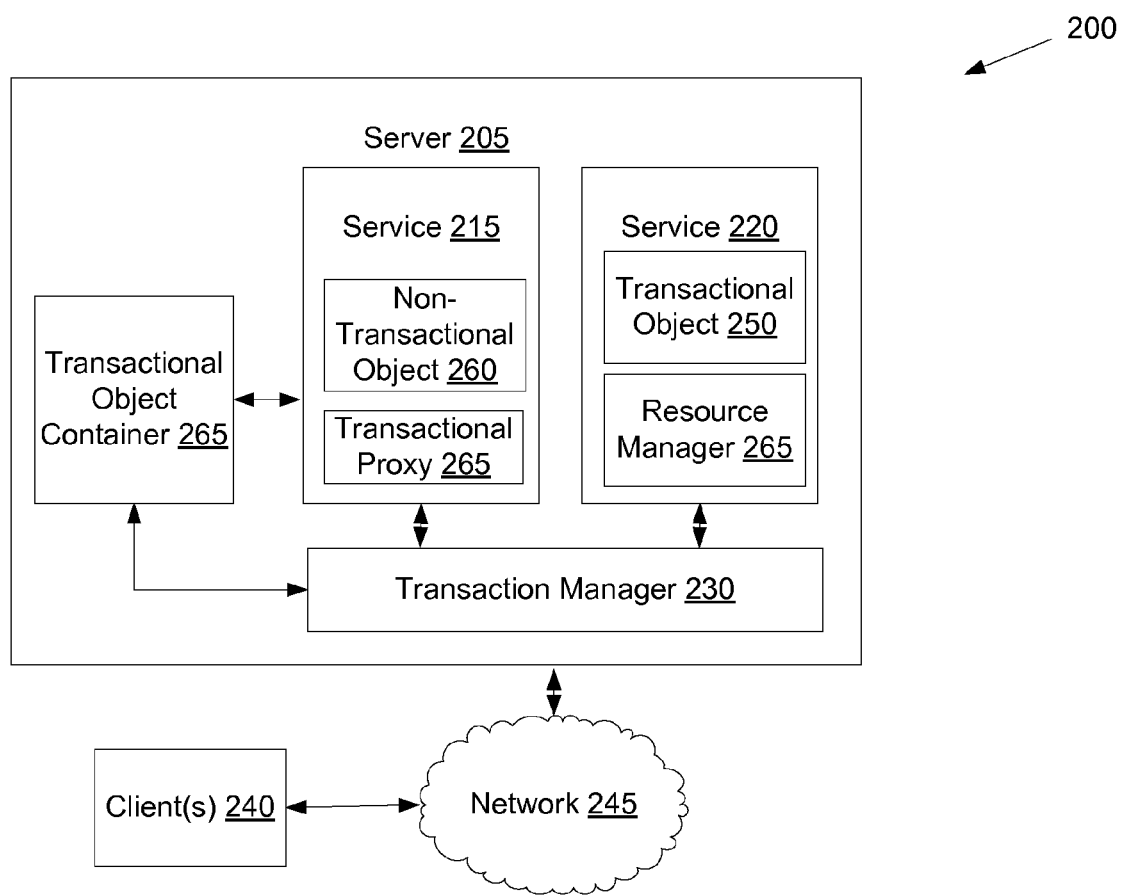
FIG. 2 illustrates an exemplary distributed computing system, in which embodiments of the present invention may operate.

FIG. 2 illustrates an exemplary distributed computing system 200, in which embodiments of the present invention may operate. The distributed computing system 200 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services. In one embodiment, the distributed computing system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In one embodiment, the distributed computing system 200 includes a server 205 connected to one or more clients 240 via a network 245. Alternatively, the distributed computing system 200 may only include multiple servers and/or the client 240 may be directly connected with server 205. The network 245 may be a private network (e.g., local area network (LAN), wide area network (WAN), intranet, etc.), a public network (e.g., the Internet), or a combination thereof.

Client(s) 240 may be, for example, personal computers (PC), palm-sized computing devices, personal digital assistants (PDA), etc. Client(s) 240 may also be applications run on a PC, server, database, etc. In the SOA, client(s) 240 include applications that access services.

Server 205 may host services, applications and/or other functionality that is available to clients 240 on the distributed computing system 200. In one embodiment, server 205 includes service 215 and service 220. Service 220 has been programmed as a transactional service, and thus contains a transactional object 250 and a resource manager 265 for managing the transactional object. A resource manager is a software module that manages a resource such as transactional object 250.

Service 215 has was not originally programmed as a transactional service. Sometime after service 215 was deployed, it was determined that service 215 should be made transactional. To make service 215 transactional, transactional object container 265 was deployed on server 205. Transactional object container 265 has generated a transactional proxy 265 for a non-transactional object 260 of service 215. The transactional proxy 265 in one embodiment acts as a resource manager for the non-transactional object. The transactional proxy 265 enables non-transactional object to participate in transactions. In one embodiment, service 215 corresponds to application 115 of FIG. 1A, and transactional object container 265 corresponds to transactional object container 110 of FIG. 1A.

Server 205 includes a transaction manager 230. A transaction manager is a software module that coordinates multiple participants during a distributed transaction. A participant may be another transaction manager (e.g., a transaction manager of another server) or a local resource manager (e.g., resource manager 265). Coordinating a distributed transaction includes determining whether each participant can commit to a transaction, directing each participant to commit if all are able, and directing each participant to rollback if not all participating nodes are able to commit.

In one embodiment, transaction manager 230 manages a transaction that includes non-transactional object 260 and transactional object 250. Transactional proxy 365 can enroll non-transactional object 260 in the transaction, and can commit or roll back the transaction upon receiving a command from transaction manager 230.

Figure 3A:
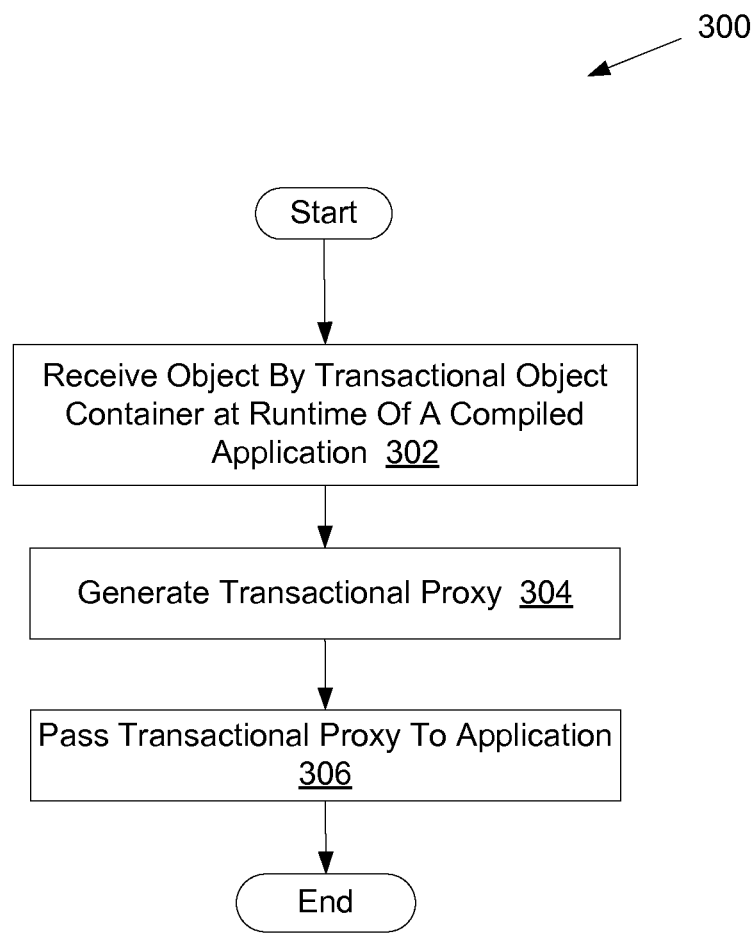
FIG. 3A illustrates a flow diagram of one embodiment for a method of transforming a non-transactional object into a transactional object.

FIG. 3A illustrates a flow diagram of one embodiment for a method 300 of transforming a non-transactional object into a transactional object. The method is performed by processing logic that comprises hardware (e.g., circuitry, dedicated logic, programmable logic, microcode, etc.), software (such as instructions run on a processing device), or a combination thereof. In one embodiment, method 300 is performed by transactional object container 110 of FIG. 1A.

Referring to FIG. 3A, at block 302 of method 300 a transactional object container receives an object at runtime of a compiled application, the object being a component of the application. At block 304, the transactional object container generates a transactional proxy of the object. The transactional proxy includes all of the features of the object (e.g., all of the methods and fields of the object), as well as additional features of the transactional object container. The features inherited from the transactional object container enable the transactional proxy to participate in transactions. For example, from the transactional object container, the transactional proxy inherits a transactional marker that a transaction system (e.g., a transaction manager) will use to verify that the transactional proxy should be included in a transaction. At block 306, the transactional object container passes the transactional proxy back to the application. The method then ends.

Figure 3B:
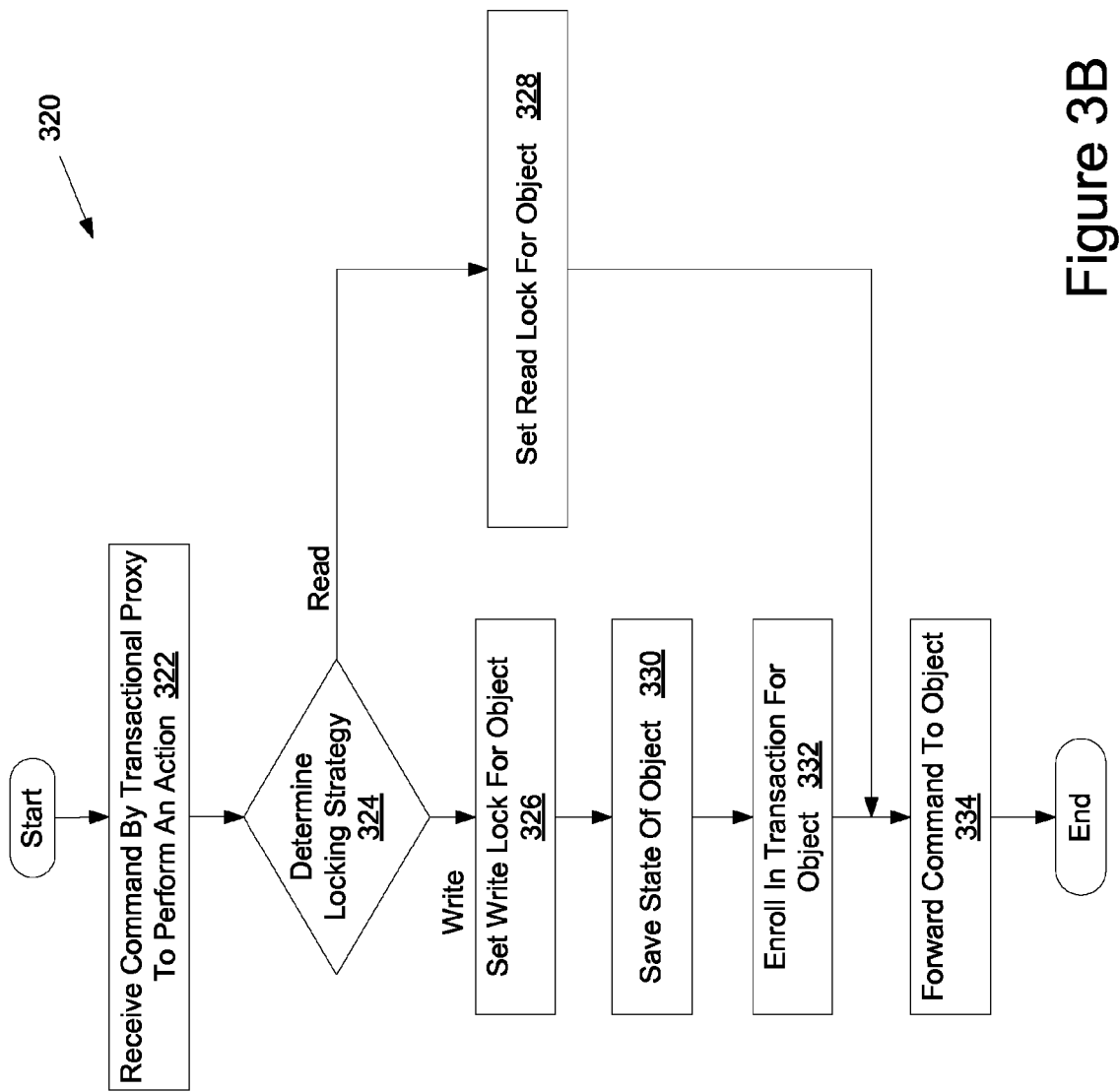
FIG. 3B illustrates a flow diagram of another embodiment for a method of participating in a transaction by a transactional proxy.

FIG. 3B illustrates a flow diagram of another embodiment for a method 320 of participating in a transaction by a transactional proxy. The method is performed by processing logic that comprises hardware (e.g., circuitry, dedicated logic, programmable logic, microcode, etc.), software (such as instructions run on a processing device), or a combination thereof. In one embodiment, method 220 is performed by transactional proxy 140 of FIG. 1A.

Referring to FIG. 3B, at block 322 of method 320 a transactional proxy receives a command to perform an action. The command may be, for example, a command to read a state of the transactional proxy or to modify a state of the transactional proxy.

At block 324, the transactional proxy analyzes one or more of the command and a current state of an object associated with the transactional proxy. Based on this analysis, the transactional proxy determines a locking strategy and/or a concurrency strategy to use. In one embodiment, when the transactional proxy identifies the command as a command to read a state of the transactional proxy, the method proceeds to block 328, and a read lock is set for the object. The method then continues to block 334. When the transactional proxy identifies the command as a command to modify a state of the transactional proxy, the method continues to block 326, and a write lock is set for the object. The method then continues to block 330.

At block 330, the transactional proxy saves a state of the object. In one embodiment, the transactional proxy generates an undo log and or a redo log for the object. At block 332, the transactional proxy enrolls the object in a transaction. At block 334, the transactional proxy forwards the command on to the object, which may then execute the command. The method then ends.

Figure 4:
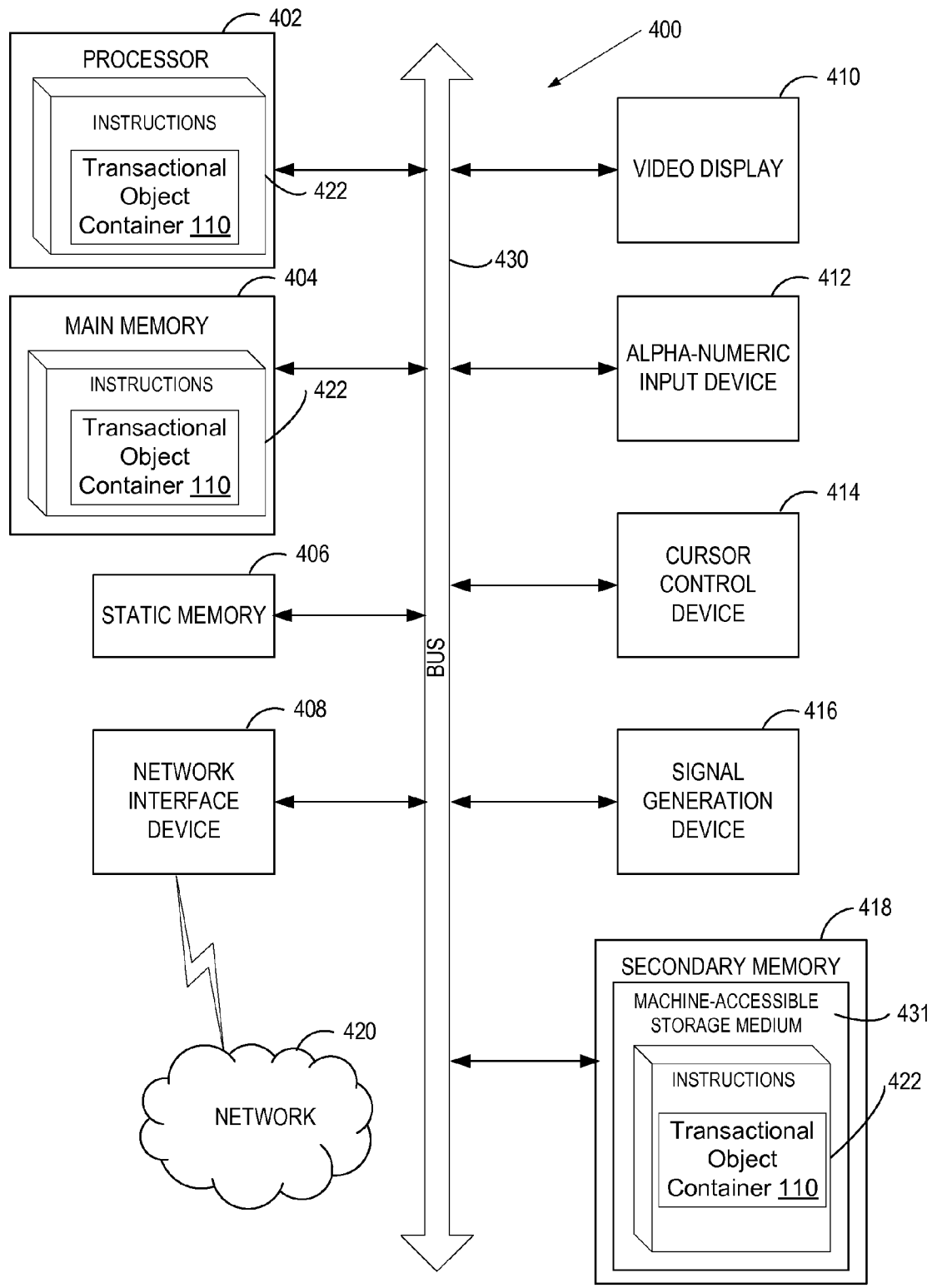
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store transactional object container 110, and/or a software library containing methods that call a transactional object container 110. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
    receiving, by a processing device, a transactional object at runtime of a compiled application, the transactional object comprising a first transactional logic;
    monitoring behavior of the transactional object;
    determining, by the processing device, a locking strategy to use for the transactional object;
    generating, by the processing device, a transactional proxy for the transactional object, the transactional proxy comprising a transactional marker, a pointer to the transactional object, and a second transactional logic that supersedes the first transactional logic, the second transactional logic comprising the determined locking strategy to be implemented by the transactional proxy in view of the monitoring; and
    passing, by the processing device, the transactional proxy to the compiled application, wherein the compiled application is to make calls on the transactional proxy instead of on the transactional object.

2. The method of claim 1, wherein the second transactional logic comprises logic for generating locks, for creating transaction logs, and for committing and aborting transactions, and wherein the transactional marker identifies to a transaction system that the transactional proxy is to be managed transactionally.

3. The method of claim 1, further comprising:
    receiving a command by the transactional proxy to perform an action;
    determining a lock to use for the transactional object in view of the received command;
    setting the lock for the transactional object; and
    forwarding the received command to the transactional object.

4. The method of claim 3, wherein the received command is a command to modify a state of the transactional object and the determined lock is a write lock, the method further comprising:
    saving the state of the transactional object;
    setting the write lock for the transactional object; and
    enrolling in an active transaction for the transactional object.

5. The method of claim 3, wherein the received command is a command to read a state of the transactional object and the determined lock is a read lock, the method further comprising:
    setting the read lock for the transactional object.

6. The method of claim 1, further comprising:
    receiving a command to generate the transactional object;
    generating the transactional object using a first factory object; and
    generating the transactional proxy for the transactional object using a second factory object that wraps the first factory object.

7. A computing apparatus, comprising:
    a memory; and
    a processing device, operatively connected with the memory, the processing device to:
        receive a transactional object at runtime of a compiled application, the transactional object comprising a first transactional logic;
        monitor behavior of the transactional object;
        determine a locking strategy to use for transactional object;
        generate a transactional proxy for the transactional object, the transactional proxy comprises a transactional marker, a pointer to the transactional object, and a second transactional logic that supersedes the first transactional logic, the second transactional logic comprises the determined locking strategy to implement by the transactional proxy in view of the monitored behavior; and
        pass the transactional proxy to the compiled application, wherein the compiled application is to make calls on the transactional proxy instead of on the transactional object.

8. The computing apparatus of claim 7, wherein the second transactional logic comprises logic to generate locks, to create transaction logs, and to commit and abort transactions, and wherein the transactional marker is to identify to a transaction system that the transactional proxy is to be managed transactionally.

9. The computing apparatus of claim 7, the processing device further to:
    receive a command by the transactional proxy to perform an action;
    determine a lock to use for the transactional object in view of the received command;
    set the lock for the transactional object; and
    forward the received command to the transactional object.

10. The computing apparatus of claim 9, wherein the received command is a command to modify a state of the transactional object and the determined lock is a write lock, the processing device further to:
    save the state of the transactional object;
    set the write lock for the transactional object; and
    enroll in an active transaction for the transactional object.

11. The computing apparatus of claim 7, the processing device further to:
  receive a command to generate the transactional object;
  generate the transactional object using a first factory object; and
  generate the transactional proxy for the transactional object using a second factory object that wraps the first factory object.

12. A non-transitory computer readable storage medium comprising instructions to cause a processing device to:
  receive, by the processing device, transactional object at runtime of a compiled application, the transactional object comprising a first transactional logic;
  monitor behavior of the transactional object;
  determine, by the processing device, a locking strategy to use for the transactional object;
  generate, by the processing device, a transactional proxy for the transactional object, the transactional proxy comprises a transactional marker, a pointer to the transactional object, and a second transactional logic that supersedes the first transactional logic, the second transactional logic comprises the determined locking strategy to implement by the transactional proxy in view of the monitored behavior; and
  pass, by the processing device, the transactional proxy to the compiled application, wherein the compiled application is to make calls on the transactional proxy instead of on the transactional object.

13. The non-transitory computer readable storage medium of claim 12, wherein the second transactional logic comprises logic to generate locks, to create transaction logs, and to commit and abort transactions, and wherein the transactional marker is to identify to a transaction system that the transactional proxy is to be managed transactionally.

14. The non-transitory computer readable storage medium of claim 13, the processing device further to:
  receive a command by the transactional proxy to perform an action;
  determine a lock to use for the transactional object in view of the received command;
  set the lock for the transactional object; and
  forward the received command to the transactional object.

15. The non-transitory computer readable storage medium of claim 14, wherein the received command is a command to modify a state of the transactional object and the determined lock is a write lock, the processing device further to:
  save the state of the transactional object;
  set the write lock for the transactional object; and
  enroll in an active transaction for the transactional object.

16. The non-transitory computer readable storage medium of claim 14, wherein the received command is a command to read a state of the transactional object and the determined lock is a read lock, the processing device further to:
  set the read lock for the transactional object.

17. The non-transitory computer readable storage medium of claim 12, the processing device further to:
  receive a command to generate the transactional object;
  generate the transactional object using a first factory object; and
  generate the transactional proxy for the transactional object using a second factory object that wraps the first factory object.

* * * * *